United States Patent
Itabashi

[11] Patent Number: 5,309,194
[45] Date of Patent: May 3, 1994

[54] FLAT-TYPE DISPLAY PANEL FIXING DEVICE

[75] Inventor: Tomoaki Itabashi, Tokyo, Japan

[73] Assignee: Asahi Kogaku Kogyo Kabushiki Kaisha, Tokyo, Japan

[21] Appl. No.: 944,979

[22] Filed: Sep. 15, 1992

[30] Foreign Application Priority Data

Sep. 18, 1991 [JP] Japan ............ 3-097076[U]

[51] Int. Cl.⁵ .................... G03B 17/18
[52] U.S. Cl. .................... 354/471; 354/288; 354/289.11
[58] Field of Search ........... 354/288, 471–475, 354/289.1–289.12

[56] References Cited

U.S. PATENT DOCUMENTS

| | | | |
|---|---|---|---|
| 4,652,932 | 3/1987 | Miyajima et al. | 358/236 |
| 4,983,996 | 1/1991 | Kinoshita | 354/106 |
| 5,008,658 | 4/1991 | Russay et al. | 340/784 |
| 5,016,034 | 5/1991 | Goto | 354/288 |

*Primary Examiner*—David M. Gray
*Attorney, Agent, or Firm*—Sandler, Greenblum & Bernstein

[57] ABSTRACT

A flat-type display panel fixing device in which a holding frame, in which a flat-type display panel is held, is connected to a prism cover without a screw. The holding frame is rotatably supported by the prism cover at one end portion, and connected to the prism cover at the other end portion, where an engaging hole provided in the holding frame is fitted to an engaging pin formed on the prism cover.

6 Claims, 6 Drawing Sheets

FLAT-TYPE DISPLAY PANEL FIXING DEVICE

BACKGROUND OF THE INVENTION

1. Field of the Invention

The present invention relates to a flat-type display panel provided on a camera, for example, for indicating various kinds of information, and more particularly, relates to a device for fixing the flat-type display panel to a base frame of the camera.

2. Description of the Related Art

Recently, cameras having a liquid crystal panel on the camera body to indicate various kinds of photographic information or a photographic operation have been developed. The liquid crystal panel is housed in a holding frame together with a light emitting panel, a shield plate, a liquid crystal driving IC and the like. The holding frame is fixed by screws to a pentagonal prism cover disposed over a pentagonal prism, or fixed by screws to a camera body.

In the conventional fixing construction described above, however, an operation of handling screws is cumbersome. Further, in a case in which holes for the screws are large, the position of the liquid crystal panel is easily offset toward the right or left, and thus a part of a mark indicated on the liquid crystal panel may be hidden by a window frame of a top cover disposed on the liquid crystal panel. In such a case, the fixing position of the holding frame would need to be changed, which is an inconvenient operation. Further, since the holding frame is usually made of plastic material, if a portion to which the holding frame is fixed is deformed, the holding frame may deviate from the original position, and thus a part of the indicated mark may be hidden by the window frame, similarly to the above problem.

SUMMARY OF THE INVENTION

Therefore, an object of the present invention is to provide a flat-type display panel fixing device by use of which a flat-type display panel can be fixed exactly to a predetermined position, the fixing operation is easy, and the number of parts is reduced to decrease the cost of the device.

According at the present invention, there is provided a device for fixing a flat-type display panel to a base frame, the device comprising a holding frame to which the flat-type display panel is fixed, and a connecting mechanism. The holding frame is rotatably supported by the base frame at a predetermined portion of the holding frame. The connecting mechanism connects the holding frame to the base frame at another portion of the holding frame.

Further, according to the present invention, there is provided a device for fixing a flat-type display panel to a base frame, the device comprising a mechanism for rotatably connecting the flat-type display panel to the base frame, and a mechanism for connecting the flat-type display panel to the base frame at a portion different from the rotatable connecting mechanism.

Furthermore, according to the present invention, there is provided a flat-type display panel fixing device comprising a holding frame for holding the flat-type display panel, and a base frame to which the holding frame is connected. The holding frame is rotatably connected to the base frame at one end portion of the holding frame. The holding frame is engaged with the base frame at the other end portion of the holding frame.

BRIEF DESCRIPTION OF THE DRAWING

The present invention will be better understood from the description of the preferred embodiments of the invention set forth below, together with the accompanying drawings, in which.

DESCRIPTION OF THE PREFERRED EMBODIMENTS

Figure 1:
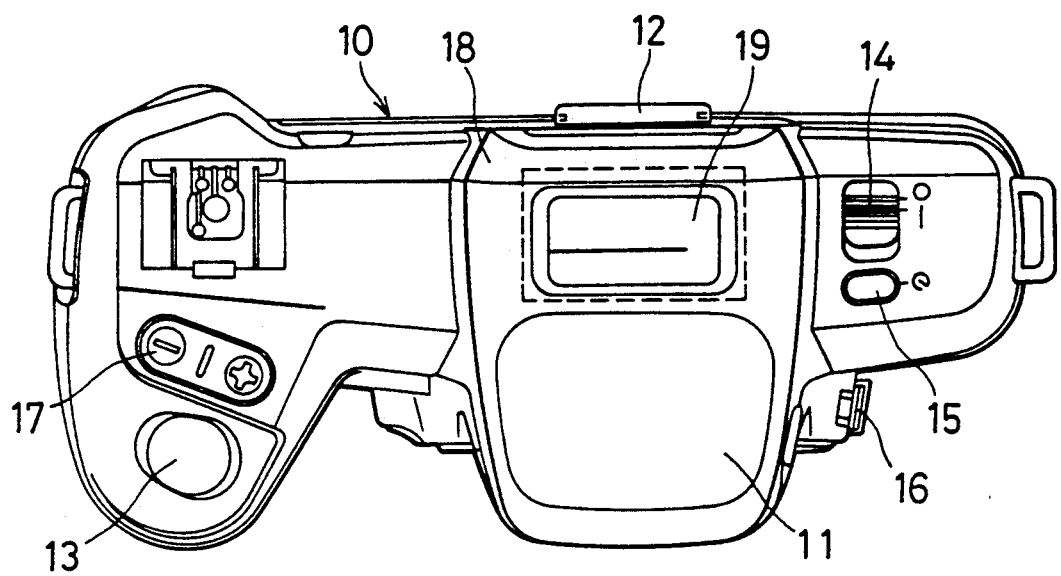
FIG. 1 is a plan view showing a camera body having a liquid crystal panel fixing device according to an embodiment of the present invention.

The present invention will now be described with reference to embodiments shown in the drawings.

Figure 2:
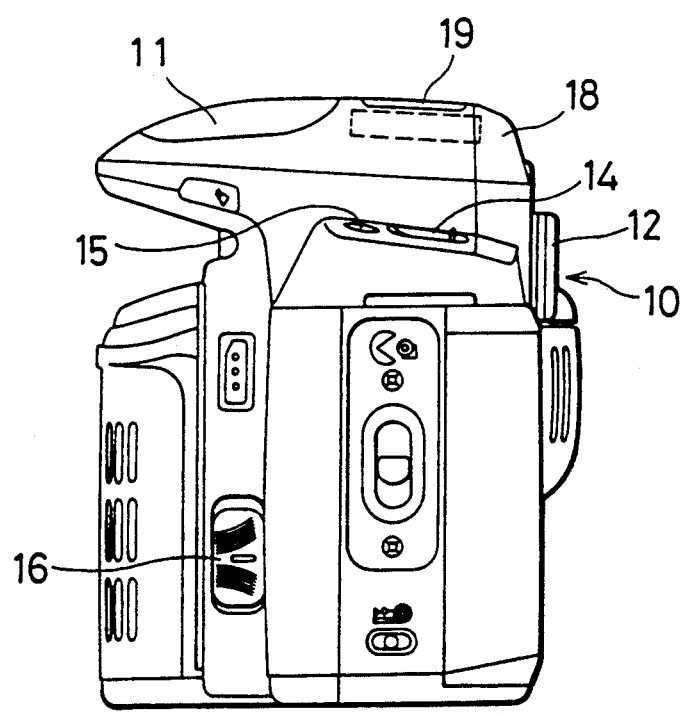
FIG. 2 is a side view of the camera body shown in FIG. 1.

FIGS. 1 and 2 show a camera body 10 having a liquid crystal indicating device according to an embodiment of the present invention.

The camera body 10 is provided with operation parts such as a flash cover 11 for covering an electronic flash installed in the camera body 10, a view finder 12, a shutter release button 13, an electrical source switch 14, a self timer button 15, a focusing mode selecting lever 16, and an exposure control button 17. A top cover 18 is projected upward at a central portion of the camera body 10, and is provided with a liquid crystal indicating panel 19, by which information, useful for photographic operations, such as adusting exposure conditions, a film winding operation, a film rewinding operation, a self timer and the like, is indicated.

Figure 3:
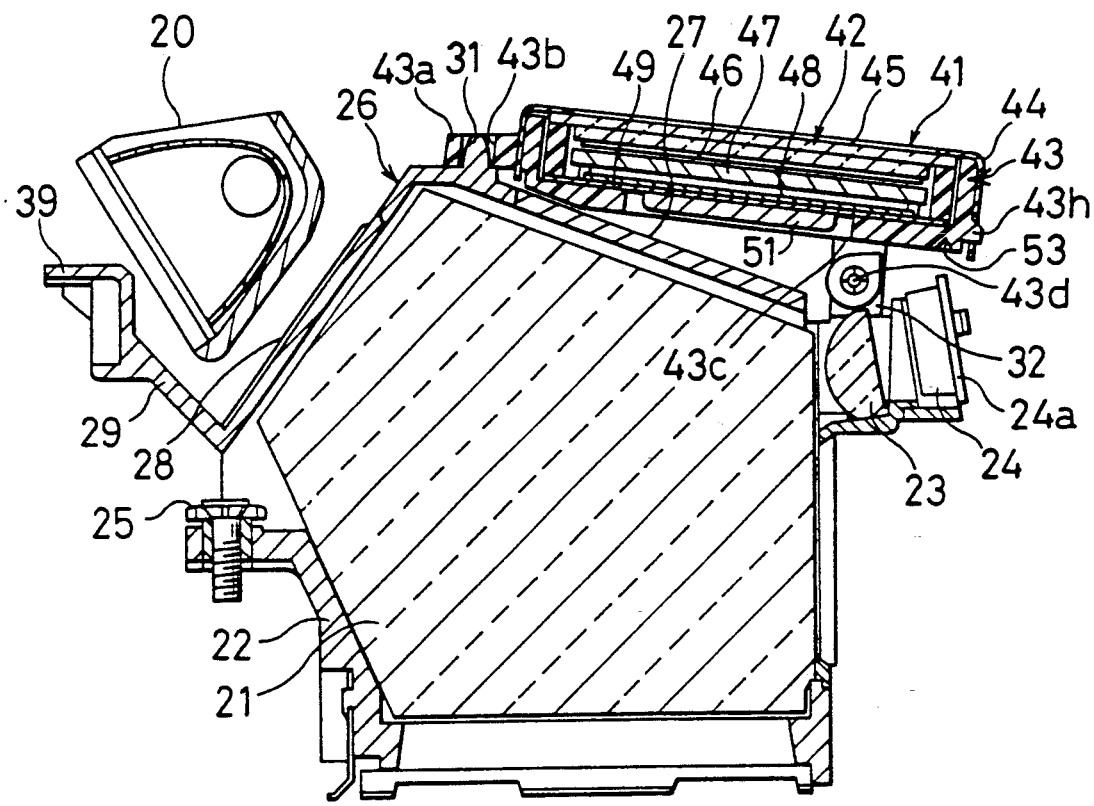
FIG. 3 is a sectional view showing an upper part of the camera body.

FIG. 3 shows an upper part of the camera body 10. A pentagonal prism 21 is held in a prism holder 22, and a focusing screen (not shown) is disposed under the pentagonal prism 21. An eyepiece (not shown) of the view finder 12 is disposed near an outlet surface of the pentagonal prism 21, whereby an object image can be observed by the view finder 12. A photometry lens 23 and a photo sensor 24 are provided at an upper side of the eyepiece. It is noted that the prism holder 22 is fixed to a front block (not shown) of the camera body 10 by a screw 25.

An object image reflected by a reflection mirror housed in the camera body 10 is formed on the focusing screen disposed under the pentagonal prism 21. The beam forming the object image is reflected by the pentagonal prism 21, and is transmitted to the eyepiece and the photometry lens 23. The beam reflected by the pentagonal prism 21 is converged through the photometry lens 23, and thus the intensity of the beam is sensed by the photo sensor 24. This sensed beam intensity is converted to an electrical signal, and transmitted to an exposure control unit (not shown) to be used for exposure control.

A prism cover or base frame 26 is disposed on an upper portion of the pentagonal prism 21. The prism cover 26 has a first slant portion 27 which is inclined backward and a second slant portion 28 which is inclined forward, which correspond to an upper surface of the pentagonal prism 21. A raised portion 29 is formed on the front end of the second slant portion 28. An electronic flash 20 is positioned between the second slant portion 28 and the raised portion 29 in a retracted condition, and supported by an arm mechanism (not shown), so that the electronic flash 20 is rotated upward and downward in association with opening and closing operations of the flash cover 11.

Figure 4:
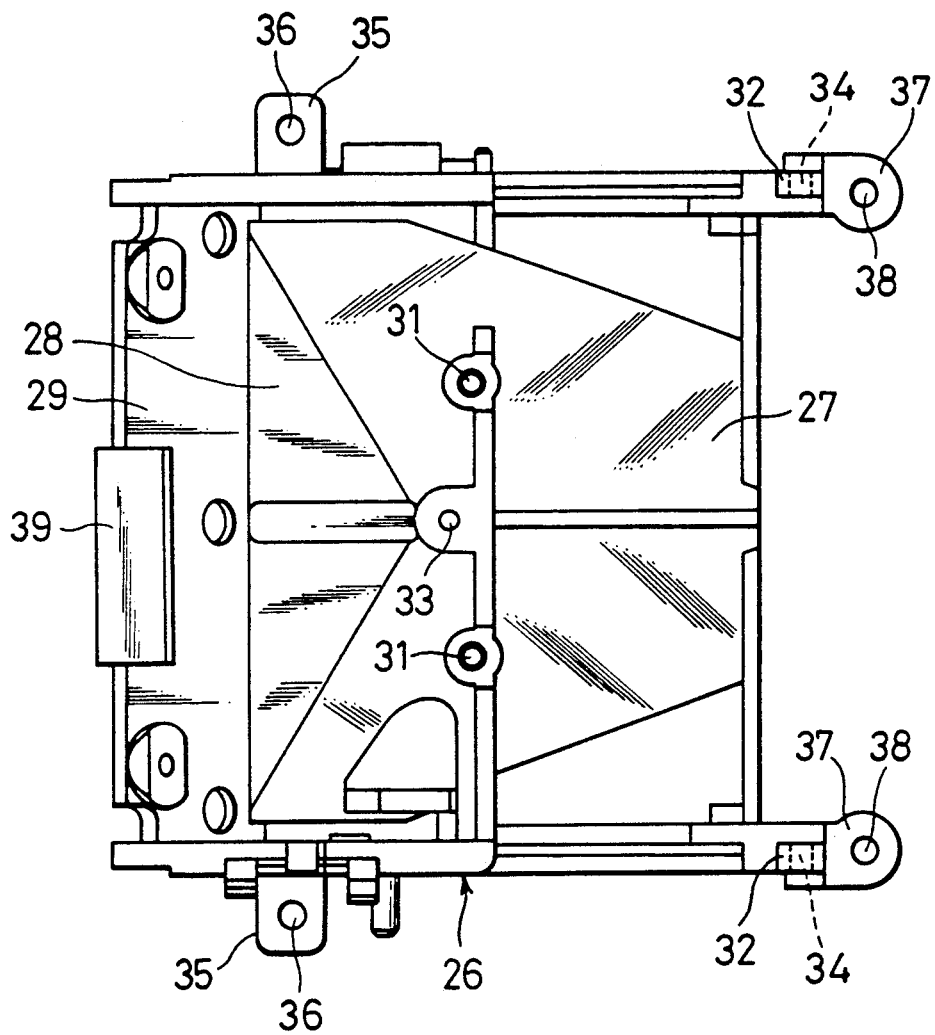
FIG. 4 is a plan view showing a prism cover.

FIG. 4 shows a plan view of the prism cover 26. A screw hole 33 for fixing the top cover 18 (see FIGS. 1 and 2) is formed approximately at a central portion or a peak portion of the prism cover 26. Engaging pins 31 for fixing a liquid crystal panel holding frame described later are projected at both sides of the screw hole 33. Support portions 32 are provided on rear end portions of the prism cover 26, and a support hole 34 extending horizontally is formed in each of the support portions 32.

The prism cover 26 has flanges 35 at front lower end portions thereof, and a screw hole 36 is formed in each of the flanges 35 to fix the prism cover 26 to the front block described above. The prism cover 26 also has flanges 37 at rear lower end portions thereof, and a screw hole 38 is formed in each of the flanges 37 to fix the prism cover 26 to the camera body 10. A mounting portion 39 to which an LED for radiating a beam is provided on a front end of the prism cover 26.

Figure 5:
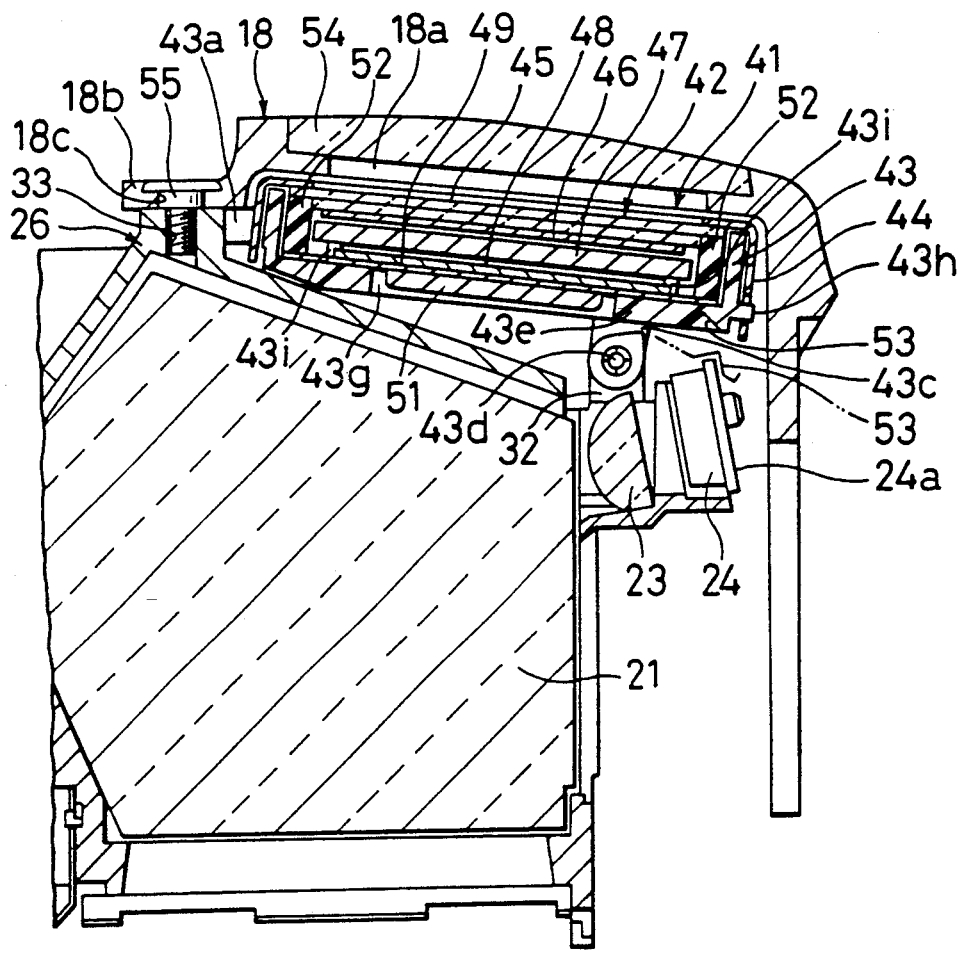
FIG. 5 is a sectional view of a liquid crystal panel unit.

As shown in FIGS. 3 and 5, the liquid crystal panel unit 41 has a liquid crystal panel 42 held in a liquid crystal panel holding frame 43 by a liquid crystal panel cover 44. The liquid crystal panel cover 44 is engaged with claws 43h formed on both side walls of the liquid crystal panel holding frame 43 to be fixed thereto. A polarizing plate 45 is disposed on a top face of the liquid crystal panel 42, and a reflection plate 46 is placed on a back face of the liquid crytal panel 42. The reflection plate 46 is constructed in such a manner that a light coming from a back side of the reflection plate 46 passes therethrough that is, light radiated from a light emitting panel 47 passes through the reflection plate 46 to reach the liquid crystal panel 42. The light emitting panel 47 for a back light, a shield plate 48, a flexible printed substrate 49 and an IC 51 are disposed under the reflecting plate 46 in turn. The shield plate 48 is provided for shielding against noise generated by the light emitting panel 47. The flexible printed substrate 49 and the IC 51 are provided for driving the liquid crystal panel 42.

The flexible printed substrate 49 is placed on a bottom 43e of the liquid crystal panel holding frame 43, and the shield plate 48 is placed on the flexible printed substrate 49. Conductive rubber elements 52 are fixed on edge portions of the flexible printed substrate 49 as shown in FIG. 5. The liquid crystal panel 42 has a pair of glass sheets, an upper cone of which is supported by the conductive rubbers elements 52. The light emitting panel 47 is supported by spacer pins 43i which are formed on the bottom 43e and extend through the flexible printed substrate 49, so that a gap is formed between the light emitting panel 47 and the shield plate 48. The IC 51 is housed in a space 43g formed in the bottom 43e, and provided on a back face of the flexible printed substrate 49.

Figure 6:
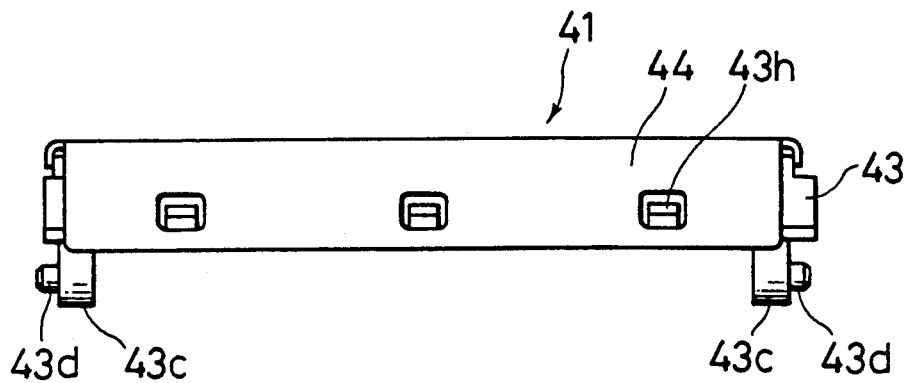
FIG. 6 is a rear view of a liquid crystal panel holding frame.

The liquid crystal panel holding frame 43 is a rectangular frame. As shown in FIG. 6, vertical projections 43c are formed at rear ends of a lower surface of the liquid crystal panel holding frame 43, and support pins 43d are formed on each of the vertical projections 43c and project horizontally. The support pins 43d are inserted in the support holes 34 formed on the prism cover 26, so that the holding frame is 43 is rotatably supported by the base frame or the prism cover 26 at one end portion of the holding frame 43.

The liquid crystal panel holding frame 43 is provided with horizontal projections 43a at the front end portion thereof. Each of the horizontal projections 43a has an engaging hole 43b corresponding to the engaging pin 31 of the prism cover 26. In particular the engaging pins 31 are inserted into the engaging holes 43b, and thus the holding frame 43 is connected to the prism cover 26 at the other end portion of the holding frame 43.

The holding frame 43 is made of plastic material, so that the horizontal projections 43a are elastically deformed and engage the engaging pin 31.

The engaging pins 31 and the engaging holes 43b are formed in such a manner that, when the holding frame 43 is rotated so that the engaging holes 43b engage the engaging pins 31, the engaging pins 31 and the engaging holes 43b are offset from each other, whereby the engaging pins 31 are tightly fitted into the engaging holes 43b.

The projections 43a are inclined slightly downward relative to the holding frame 43 in such a manner that, when the holding frame 43 is rotated to be connected to the engaging pins 31, the engaging holes 43b engage the engaging pins 31 before the holding frame 43 reaches a horizontal position. Therefore, the engaging pins 31 are smoothly fitted into the engaging holes 43b when the holding frame 43 is connected to the engaging pins 31.

Note, as shown in FIGS. 3 and 5, a notch 53 is formed on an under surface at a rear end portion of the holding frame 43, whereby, when the liquid crystal panel holding frame 43 is rotated upward (clockwise in the drawing), the liquid crystal panel holding frame 43 does not interfere with a fixing plate 24a of the photo sensor 24.

The top cover 18 is disposed on an upper portion of the liquid crystal panel unit 41, as shown in FIG. 5. A window 18a is formed in a part of the top cover 18 corresponding to the liquid crystal panel 42, and a transparent plate 54 is mounted over the window 18a. A projecting plate 18b is formed on a tip portion of the top cover 18, and a hole 18c is formed in the projecing plate 18b. A screw 55 is inserted into the hole 18c of the top cover 18 and the hole 33 of the prism cover 26, so that the top cover 18 is fixed to the prism cover 26.

An operation of assembling each of the above members is described below.

After the prism cover 26 is fixed to the front block and the camera body 10 by screws, the support pins 43d of the liquid crystal panel holding frame 43 are inserted into the support holes 34 of the prism cover 26. It is noted that a main flexible printed substrate and the flexible printed substrate 49 for driving the liquid crystal panel 42 were previously disposed under the liquid crystal panel unit 41.

Figure 7:
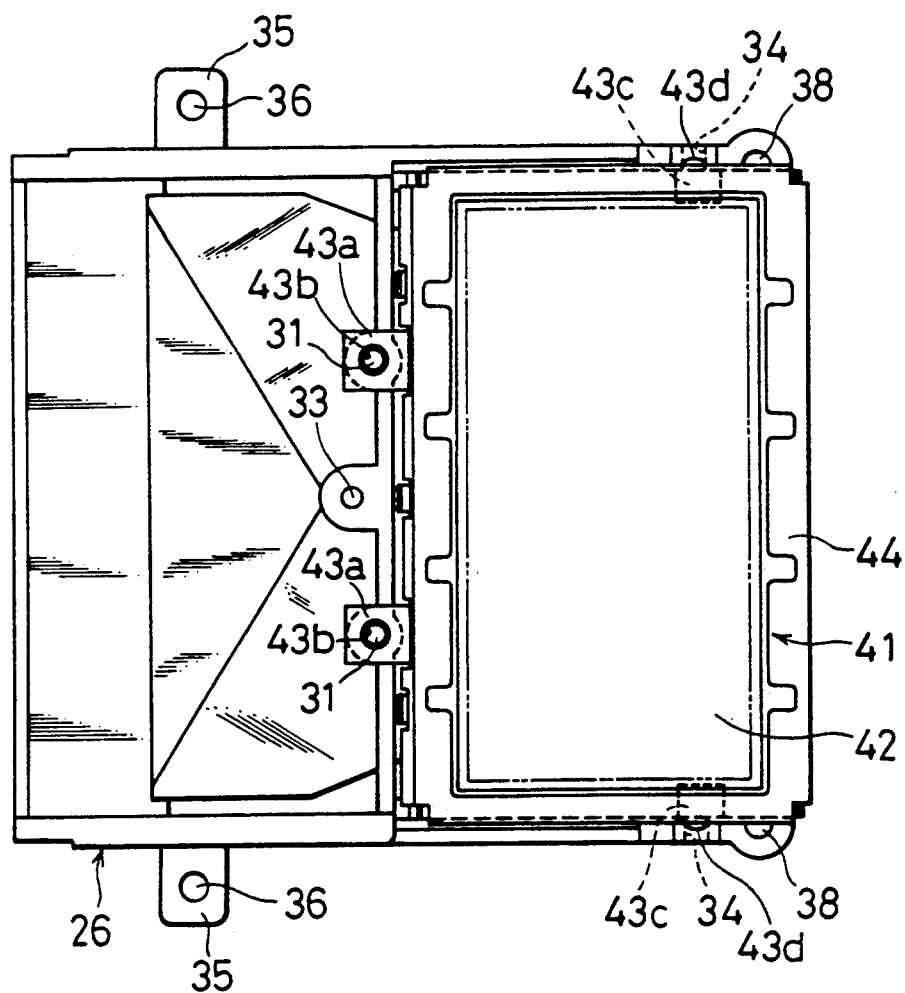
FIG. 7 is a plan view showing a state in which the liquid crystal panel holding frame is fixed to the prism cover.
Figure 8:
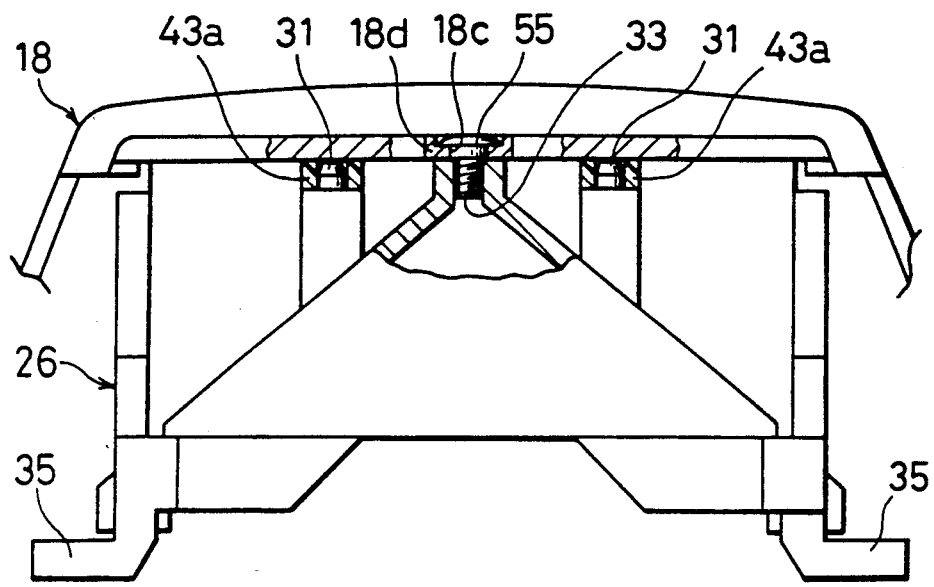
FIG. 8 is a partly sectional front view showing a state in which the liquid crystal panel holding frame is fixed to the prism cover.
Figure 9:
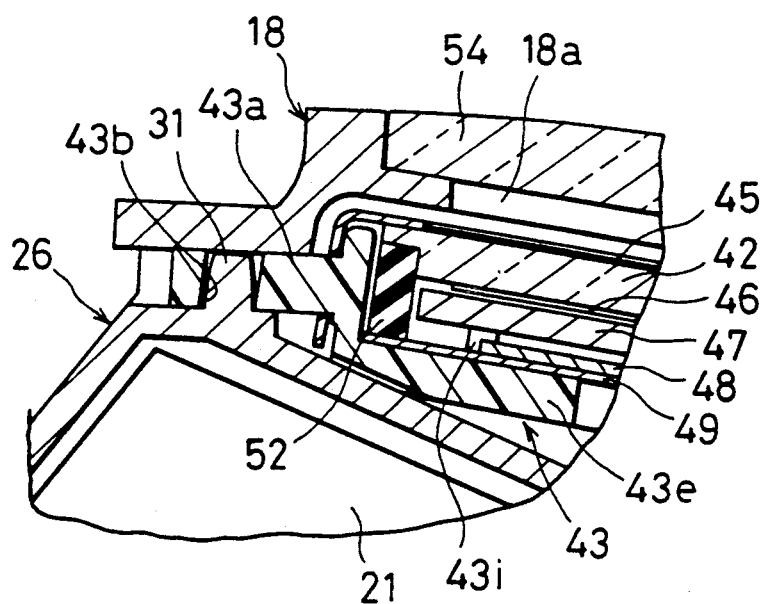
FIG. 9 is an enlarged sectional view showing a state in which the liquid crystal panel holding frame is fixed to the prism cover.

Then, while pressing the main flexible printed substrate and the flexible printed substrate 49, the liquid crystal panel unit 41 is rotated about the support pins 43d, and thus the engaging holes 43b of the liquid crystal panel holding frame 43 engage the engaging pins 31 of the prism cover 26, as shown in FIGS. 7 through 9. The engaging pins 31 are formed at positions slightly offset in a horizontal direction from the position corresponding to the engaging holes 43b. Therefore, when the liquid crystal panel holding frame 43 is downwardly rotated, the engaging holes 43b engage the engaging pins 31 and the projections 43a are slightly deformed by contact with the engaging pins 31. Accordingly, the engaging holes 43b engage the engaging pins 31 with a certain amount of pressure applied at the contact point, so that the engaging holes 43b are not easily disengaged from the engaging pins 31. Thus, the liquid crystal panel unit 41 is assembled on the prism cover 26, and the top cover 18 is then mounted on the liquid crystal panel unit 41.

In the embodiment, screws are not used to fix the liquid crystal panel holding frame 43, but the holding frame 43 is rotatably supported by the prism cover 26 at one end portion of the holding frame 43, and connected to the prism cover 26 by the engaging holes 43b and the engaging pins 31 at the other end portion of the holding frame 43 while the projections 43a are deformed. Therefore, the holding frame 43 is not offset from the original position by any inaccuracy of a screw hole, and thus the accuracy of fixing the liquid crystal panel is improved. That is a part of a mark indicated on the liquid crystal panel 42 is not hidden by the window frame of the top cover 18. Further, a fixing operation of a screw and an adjustment of the fixing position of the screw are not needed, and the flexible printed substrate is easily held by the liquid crystal panel 42, and thus the assembly operation is improved. Still further, since the liquid crystal panel need not be removed as a whole, repairing the camera is easily carried out. Further, the number of parts, such as screws is reduced, so that the cost can be lowered.

Although the above embodiment is applied to a liquid crystal panel mounted on a camera body, the present invention is not restricted to the embodiment, regarding a position where the liquid crystal panel is attached, and an interior construction of the camera. Further, the present invention can be applied to a fixing structure of a liquid crystal panel provided on a photographic device besides a camera, and an audio device and the like.

Still further, the present invention can be applied to a plasma display panel and an electro luminance display panel.

Although the embodiments of the present invention have been described herein with reference to the accompanying drawings, obviously many modifications and changes may be made by those skilled in this art without departing from the scope of the invention.

The present disclosure relates to subject matter contained in Japanese Utility Model Application No. 3-97076 (filed on Sep. 18, 1991) which is expressly incorporated herein by reference in its entirety.

I claim:

1. A device for fixing a flat-type display panel to a base frame, said device comprising:
   a holding frame to which said flat-type display panel is fixed, said holding frame being rotatably supported by said base frame at a predetermined portion of said holding frame;
   means for connecting said holding frame to said base frame at another portion of said holding frame; and
   said connecting means including an engaging pin formed on said base frame, and an engaging hole formed in said holding frame and engaging said engaging pin;
   wherein said engaging pin and said engaging hole are formed in such a manner that, when said holding frame is rotated so that said engaging hole engages said engaging pin, said engaging pin and said engaging hole are offset from each other, whereby said engaging pin is tightly fitted in said engaging hole.

2. A device according to claim 1, wherein said engaging hole is formed in a projection formed on said holding frame, said projection being inclined downward relative to said holding frame in such a manner that, when said holding frame is rotated to be connected to said engaging pin, said engaging hole engages said engaging pin before said holding frame reaches a horizontal position.

3. A device according to claim 1, wherein said engaging hole is inclined, whereby said engaging pin is smoothly fitted in said engaging hole when said holding frame is connected to said engaging pin.

4. A device according to claim 1, wherein said holding frame is provided with a notch, whereby, when said holding frame is rotated, said holding frame does not interfere with a member provided around said flat-type display panel.

5. A device for fixing a flat-type display panel to a base frame, said device comprising:
   means for rotatably connecting said flat-type display panel to said base frame;
   means for connecting said flat-type display panel to said base frame at a portion different from said rotatable connecting means; and
   said connecting means including an engaging pin formed on said base frame, and an engaging hole formed in said rotatable connecting means and engaging said engaging pin;
   wherein said engaging pin and said engaging hole are formed in such a manner that, when said rotatable connecting means is rotated so that said engaging hole engages said engaging pin, said engaging pin and said engaging hole are offset from each other, whereby said engaging pin is tightly fitted in said engaging hole.

6. A flat-type display panel fixing device comprising:
   a holding frame holding said flat-type display panel;
   a base frame to which said holding frame is connected;
   said holding frame being rotatably connected to said base frame at one end portion of said holding frame, said holding frame engaging said base frame at the other end portion of said holding frame; and
   said connecting means including an engaging pin formed on said base frame, and an engaging hole formed in said holding frame and engaging said engaging pin;
   wherein said engaging pin and said engaging hole are formed in such a manner that, when said holding frame is rotated so that said engaging hole engages said engaging pin, said engaging pin and said engaging hole are offset from each other, whereby said engaging pin is tightly fitted in said engaging hole.

* * * * *